United States Patent [19]

Almagro

[11] 4,248,600
[45] Feb. 3, 1981

[54] HIGH SOLIDS AQUEOUS SILICA DISPERSION

[75] Inventor: Guillermo A. Almagro, Aberdeen, Md.

[73] Assignee: J. M. Huber Corporation, Locust, N.J.

[21] Appl. No.: 910,304

[22] Filed: May 30, 1978

[51] Int. Cl.³ .............................. B01J 8/10; B01J 13/00
[52] U.S. Cl. ............................. 23/293 R; 106/288 B; 106/309; 252/313 S
[58] Field of Search .............. 23/293 R, 313 AS, 313, 23/ P; 106/288 B, 309; 252/313 S; 423/335, 338, 339

[56] References Cited

U.S. PATENT DOCUMENTS

| | | | |
|---|---|---|---|
| 3,110,606 | 11/1963 | Bertorelli | 106/288 B |
| 3,441,387 | 4/1969 | Dye | 23/313 AS |
| 3,832,434 | 8/1974 | Flood et al. | 23/313 AS |
| 3,857,925 | 12/1974 | Sirianni et al. | 106/288 B |
| 3,931,036 | 1/1976 | Pierce | 23/313 AS |
| 3,961,968 | 6/1976 | Wales | 252/313 S |
| 4,126,423 | 11/1978 | Kongsgaarden | 23/293 R |
| 4,126,424 | 11/1978 | Kongsgaarden | 23/293 R |

*Primary Examiner*—Bradley R. Gerris
*Attorney, Agent, or Firm*—Ernest A. Schaal; Harold H. Flanders

[57] ABSTRACT

A method for increasing the bulk density of silica. Acid is added to an aqueous silica wet cake slurry to bring the pH to about 1.8 to 4.0, and dry fine particle silica is added with an agitator rpm of at least 2000 rpm. The acid and silica are alternately added until a homogeneous consistency is obtained with a solids concentration of above 30%.

5 Claims, No Drawings

HIGH SOLIDS AQUEOUS SILICA DISPERSION

DESCRIPTION OF THE PRIOR ART

1. Field of the Invention:

In general, the present invention relates to silicas, and more specially it relates to increasing the bulk density of silicas.

2. Description of the Prior Art:

Silica pigments having high oil absorptions are generally derived from precipitated silica having high structure. A slurry of such silica pigments has a wet cake moisture in the order of 75 to 90 percent. When this silica is dried and milled, a porous and low bulk density material is produced. Its bulk density is in the range of 5 to 10 lbs/ft$^3$. The average particle size range is about 5 microns. This silica is useful in the diazo process for making blueprints and the like.

In the diazo process, a solution of diazo dye, acid, silica and starch binder is coated on a sheet of paper and the coated paper is allowed to dry. Paper transparent to ultraviolent light and bearing the pattern to be produced is put on top of the coated diazo paper and exposed to ultraviolet light to produce a latent image on the coated diazo paper. The diazo paper is then developed by exposure to ammonia vapor. The ammonia vapor neutralizes the acid and develops the latent image.

Shipment costs of the low bulk density silica can become enormous over long distances since the shipping cost is based on volume. This problem is overcome in the present invention by shipping the silica in the form of a wet cake with a solids concentration of 30 to 40 percent, preferably 36 percent. Only 68.4 lbs of dry silica (6 lbs/ft$^3$) can be packed in a 55 gallon drum (11.4 ft$^3$). On the other hand, 550 lbs of 30 percent solids aqueous acid wet cake can be loaded into a 55 gallon drum, representing 165 lbs of dry material. Consequently, 141% more material can be shipped as wet cake slurry than as dry bulk material.

U.S. Pat. No. 2,731,326 (Alexander et al) teaches a method of causing silica to accrete to aggregates larger than colloidal size by mixing active silica with an aqueous suspension of the aggregates. Alexander et al teaches away from the present invention by teaching pH levels of 8 to 11, agitating the mix at only 400 rpm, and a final filter cake containing only 6 to 7% solids.

U.S. Pat. No. 2,863,727 (Thornhill) discloses a method of removing water from a silica slurry in a finely divided filterable form. In this process, the slurry is filtered while the pH is above 6 to produce a filter cake containing at least 12% solids. The pH of the filter cake is then adjusted to below 5.75 while maintaining the solids content of the resulting product at least 12% to produce a fluid slurry. Thornhill teaches a method of producing a fluid slurry, it does not teach a method of increasing the bulk density of the silica to reduce shipping costs.

U.S. Pat. No. 2,924,510 (Allen) teaches a method of recovering silica from a low solids content slurry without the problems inherent in the filtration process. Allen teaches mixing the low solids content slurry with a high solids content slurry and then drying the mixture. Allen does not disclose adding dry silica to the slurry, nor does he teach adding acid to maintain the pH of the slurry between 1.8 and 4.0.

U.S. Pat. No. 3,857,925 (Sirianni et al) teaches a silica prepared by diluting an aquagel formed by adding acid to sodium silicate, then adding sodium silicate solution and acid to the aquagel and recovering the silica formed. The Sirianni et al patent does not teach adding silica to a slurry. Sodium silicate is added instead of silica.

U.S. Pat. No. 3,928,540 (Morgan) teaches the acidification of sodium silicate to make silica, with more silicate being added to the slurry when the viscosity rises to at least 550 cp. As in the Sirianni et al patent, the Morgan patent discloses adding sodium silicate to the slurry, not silica.

None of these patents teach adding dry silica to a silica slurry in order to increase the bulk density of the silica to a value greater than that of dried silica.

SUMMARY OF THE INVENTION

Accordingly, it is an object of this invention to provide a new and highly effective process for increasing the bulk density of silicas.

It is a further object of this invention to reduce the shipping costs in transporting silica pigments.

Other objects and a fuller understanding of the invention may be had by referring to the following description and claims.

The present invention achieves its objectives by bringing the pH of the aqueous silica wet cake slurry to about 1.8 to 4.0 and then adding dry, fine particle silica under intense agitation and then alternating the addition of acid and dry silica until a homogenous consistency is obtained. All of the dry silica has a particle size of less than ten micrometers. Preferably, the silica wet cake is peptized by mixing it with acid until a thin fluid consistency is obtained, before the dry silica is added.

The intense agitation is done at an agitator rpm of at least 2000 rpm. The concentration of the acid is preferably between 2.5 and 6.0 normal, and the acid is preferably either citric acid, phosphoric acid, para-toluenesulfonic acid or methyl sulfonic acid.

DESCRIPTION OF THE PREFERRED EMBODIMENTS

In its broadest aspect, the present invention is based on the discovery that the bulk density of silica can be increased by increasing the solids content of an aqueous silica wet cake slurry to above 30% by alternately (1) adding acid to the slurry to bring the pH to between 1.8 and 4.0 and (2) adding dry, fine particle silica under intense agitation. These two steps are alternated until a homogeneous consistency is obtained. Preferably, the silica wet cake is peptized by mixing it with acid until a thin fluid consistency is obtained, before the dry silica is added.

The intense agitation is achieved by a disperser operating at rpms of at least 2000 rpm, preferably in the range of 2000 and 3000 rpm. Below speeds of 2000 rpm the slurry will not disperse homogeneously. This intense agitation must occur during the addition of the dry, fine particle silica, but may also occur during the addition of the acid.

As known in the art, commercially available silicas can broadly be divided into two basic categories. The categories are those produced from a liquid phase and those from a vapor phase process.

Liquid phase silicas include precipitated silicas produced by acidulating an alkali metal silicate with an acid such as sulfuric acid. Further liquid phase silicas are silica gels and colloidal silicas. Examples of prior techniques involving the acidulation of a silicate solution to produce precipitated silicas are disclosed in U.S. Pat. Nos. 3,110,606 and 3,582,379.

Vapor process silicas, also called fumed and pyrogenic silicas, are prepared by reacting silicon tetrachloride vapor with a oxygen-hydrogen gas at high temperatures to produce silica and hydrogen chloride.

The silica used in the present invention is a fine precipitated silica with a diameter between 3 and 10 micrometers. This small particle size is needed so as not to form specks on the surface of paper coated with this silica.

The acid is needed to reduce the pH of the slurry so that higher solids contents are possible. About 20% solids is the highest solids content that can be achieved without adjusting the pH of the slurry. The acid is preferably either citric acid, phosphoric acid, para-toluenesulfonic acid or methyl sulfonic acid. These acids are compatible with the diazo process.

The acid concentration is preferably between 2.5 and 6.0 normal, more preferably about 6.0 normal. The higher normality is preferred because this means less water is being added to the slurry. Some water is needed in the slurry for the agitator to produce high shear mixing when the silica is added.

In the preferred embodiment, a silica wet cake slurry is peptized by mixing in 6.0 normal acid which is either citric acid, phosphoric acid, para-toluenesulfonic acid or methyl sulfonic acid until a thin fluid consistency is obtained. Then the steps of (1) adding acid to the slurry to bring the pH to about 1.8 to 4.0 and (2) adding dry, fine particle silica with an agitator rpm of at least 2000 rpm are alternated until a homogeneous consistency is obtained with a solids concentration of above 30%.

The invention will be further illustrated by the following examples which set forth particularly advantageous method and composition embodiments. While the examples prove to illustrate the present invention, they are not intended to limit it thereto.

PREPARATION OF SILICA

EXAMPLE A 37.85 liters of 13.3 percent sodium silicate solution, 2.7 molar ratio, was put into a stainless steel reactor provided with a stirrer, then heated to 79.4° C. 11.4 percent sulfuric acid at 32.2° C. was then added into the reactor at a rate of 450 ml/min until the final pH was 5.8. The batch was digested at 92.8° C. for 20 minutes then the batch was filtered and washed. The wet cake contained 15 percent solids. A dry material prepared by the same process was spray dried and then air milled yielding an average particle size of 1.5 microns. Its bulk density was 80.1 kg/cm$^3$, its surface area was 100 m$^2$/g and its oil absorption was 200 cc oil/100 g pigment.

EXAMPLES I-III 300 ml, 3 normal acid solutions of citric, phosphoric and para-toluenesulfonic acids respectively were prepared. Then, 1000 grams of the silica wet cake of Example A was placed in a 2 liter stainless steel container and agitated with a disperser at 2000-3000 rpm. The silica wet cake was peptized with a 100 ml portion of the 3 normal acid until a thin fluid consistency was obtained. Then 150 grams of dry silica of Example A (5 percent moisture) were added and agitated vigorously. The addition of dry silica was alternated with 100 ml portions of acid until a total of 360 grams of the dry silica was added. The resulting product contained approximately 32 percent solids with a pH of between 1.8 and 2.4.

EXAMPLES IV-VI

In this example, 500 grams of the prepared acidified wet cake from Examples I-III were agitated vigorously in a stainless steel container with a disperser at about 2000 rpm, and 100 grams of the dry silica of Example A were added very gradually until a homogeneous consistency was obtained. The resulting product contained between 39 and 40 percent solids. This product is thixotropic which can be redispersed upon agitation.

Thus, in operation, the bulk density is increased by increasing the solids content of an aqueous silica wet cake slurry to above 30 percent by alternately adding citric acid, phosphoric acid, para-toluenesulfonic acid or methyl sulfonic acid to the slurry to bring the pH to between 1.8 and 4.0 and then adding dry, fine particle silica under intense agitation with an agitator rpm in excess of 2000 rpm.

While the present invention has been described with reference to specific embodiments, this application is intended to cover those various changes and substitutions which may be made by those skilled in the art without departing from the spirit and scope of the appended claims.

I claim:

1. A process for increasing the bulk density of silica for shipment comprising the steps of:
   (a) adding acid to an aqueous silica wet cake slurry to bring the pH to about 1.8 to 4.0;
   (b) adding dry, fine particle precipitated silica having a size between three and ten micrometers with an agitator rpm of at least 2000 rpm;
   wherein steps (a) and (b) are alternated until a homogeneous consistency is obtained with a solids concentration of above 30%.

2. A process according to claim 1 wherein the concentration of the acid is between 2.5 and 6.0 normal.

3. A process according to claim 2 wherein the concentration of the acid is about 6.0 normal.

4. A process according to claim 1 wherein the acid is selected from the group consisting of citric acid, phosphoric acid, para-toluenesulfonic acid and methyl sulfonic acid.

5. A process according to claim 1 wherein the silica wet cake is peptized by mixing it with acid until a thin fluid consistency is obtained prior to the addition of any dry silica.

* * * * *